3,475,302
ELECTROLYTIC HYDROGEN PURIFICATION AND RECOVERY OF SAME
Stanley Harold Langer, Madison, Wis., and Robert George Haldeman, Rowayton, Conn., assignors to American Cyanamid Company, Stamford, Conn., a corporation of Maine
Continuation-in-part of application Ser. No. 267,147, Mar. 22, 1963. This application Aug. 7, 1967, Ser. No. 662,261
Int. Cl. C01b 1/27; B01k 3/10
U.S. Cl. 204—129         8 Claims

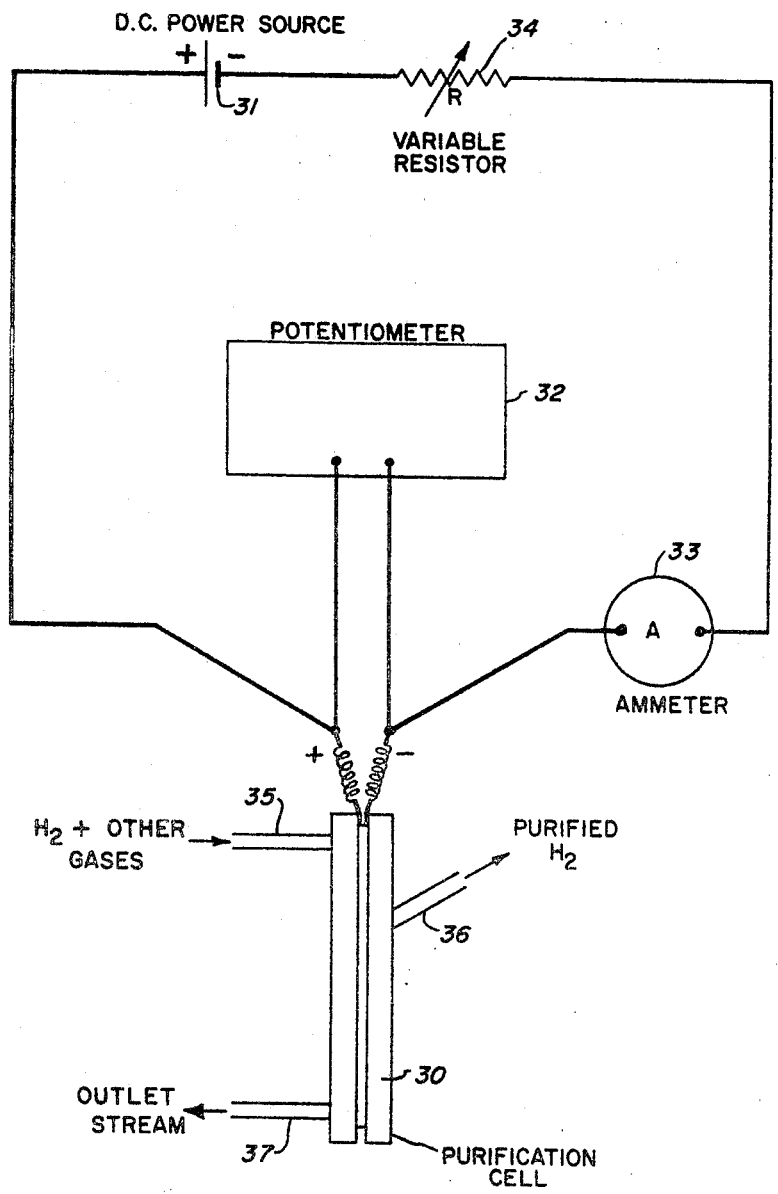

ABSTRACT OF THE DISCLOSURE

This application is directed to an improved process for purifying and separating hydrogen from an impure hydrogen-containing gas mixture to the substantial exclusion of inert gases present therein utilizing a matrix purification cell as defined in FIGURE 2 of the drawing which consists essentially in the steps of: (a) introducing an impure hydrogen-containing gas mixture into a first zone of said cell while contacting a gas permeable, but liquid impermeable, non-electrolyte immersed positive electrode comprising at least one active metal catalyst; (b) passing at least a portion of said impure hydrogen-containing gas mixture through said positive electrode into a second zone of said cell comprising a matrix saturated with electrolyte; (c) electrolytically and selectively effecting solubilization of the hydrogen in said impure hydrogen-containing gas mixture at the interface between said elecrode and said matrix; (d) contacting the matrix containing the so-electrolytically solubilized hydrogen with a second gas permeable, but liquid impermeable, non-electrolyte immersed negative electrode comprising at least one active metal catalyst; (e) reconstituting at said negative electrode substantially pure hydrogen gas from the so-electrolytically solubilized hydrogen; (f) passing the resultant substantially pure hydrogen gas through said negative electrode into a third zone of said cell; and (g) thereafter recovering in controlled amounts substantially pure hydrogen gas free from inert impurities from said third zone.

---

Figure 1:
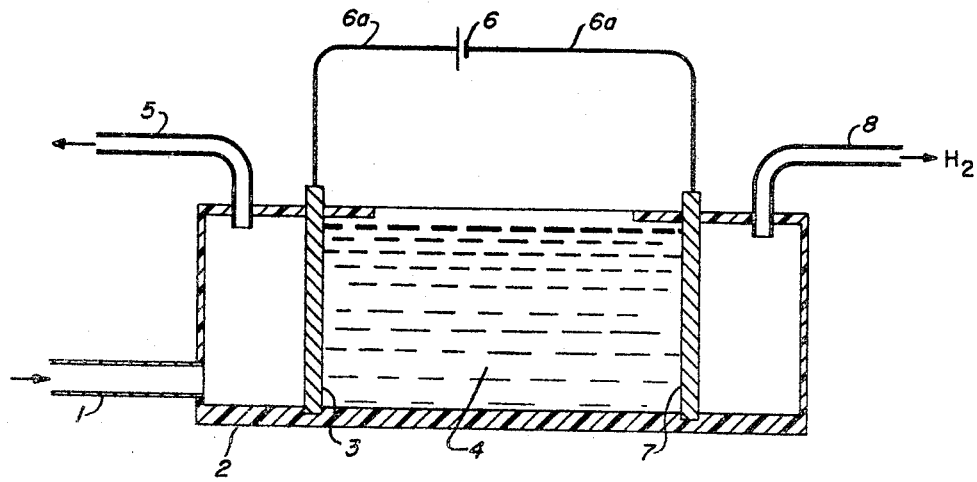

This application is a continuation-in-part of our copending application for United States Letters Patent, Ser. No. 267,147, filed on Mar. 22, 1963, and now abandoned.

The present invention relates to a novel electrolytic process for separating and removing hydrogen from a mixture of hydrogen and other gases. More particularly, it relates to a method for separating and removing hydrogen from a mixture of gases utilizing an electrolyte-containing purification cell as hereinbelow defined.

It is known that commercially obtained hydrogen is often quite impure. Many processes have been developed to purify and separate hydrogen from gas mixtures. One such process involves chromatographic selective absorption. Another process involves injecting a mixture containing impure gases into a tube or a battery of tubes composed of palladium or a palladium alloy. Gases other than hydrogen are blocked by the tube wall permitting hydrogen to selectively diffuse through. Unfortunately, none of these methods for effecting hydrogen purification is wholly satisfactory. For instance, the use of palladium as a diffusion membrane is not completely satisfactory because the process requires high temperatures and pressure differences, thereby substantially increasing the cost of the hydrogen purification process. A third method, similarly unsatisfactory, involves the use of plastic diffusion membranes. However, substantial hydrogen enrichment rather than purification occurs so that hydrogen cannot be recovered as a substantially pure gas. There exists, therefore, a need for an efficient process to effect separation of impure mixtures of hydrogen in an economical and straightforward manner.

It is, therefore, a principal object of the present invention to provide a novel process for separating hydrogen from gaseous mixtures. A further object is to provide a process for the purification of hydrogen electrolytically from impure gas mixtures containing hydrogen. It is a still further object to provide a process for metering hydrogen gas obtained from gaseous mixtures. Other objects and advantages will become apparent from a consideration of the following description.

To this end, a purification cell is provided to effect substantial purification of hydrogen from gas mixtures. The purification cell contemplates the use of an electrolyte with a plurality of gas-liquid electrodes upon which an external potential is imposed. Impure hydrogen-gas mixtures, when fed to one gas-liquid electrode, are purified whereby substantially pure hydrogen gas is recovered from the other electrode.

According to one embodiment of the present invention, a purification cell comprising a gas permeable container or membrane in contact with (a) an electrolyte, such as aqueous sulfuric acid, aqueous alkali or a non-aqueous, organic electrolyte, and (b) a plurality of electrodes comprising a catalytic agent, can be assembled in a straightforward manner. In this manner, ready separation of pure hydrogen from its impurities is realized.

The impure hydrogen-gas mixture can be derived from many sources. These include, for instance, gases resulting from ammonia dissociation, methanol-steam reforming, partial oxidation process or natural gas-steam reforming.

In general, electrodes are separated from each other by means of an electrolyte. Across each of the catalytic electrodes is attached an external power source, such as for instance a dry cell. Impure hydrogen is permitted to contact the positive electrode or anode of the purification cell. Under the influence of the imposed external potential and in the presence of acid electrolyte, hydrogen ions and electrons form at the positive electrode or anode. The latter ions are transported to the other electrode or cathode through the electrolyte while electrons flow through the external circuit. At the cathode, hydrogen as such is reformed and substantially pure hydrogen gas is withdrawn to the exclusion of the other gases originally present. The latter gases are substantially insoluble in the acid electrolyte. However, in the presence of an alkali electrolyte in which the impure gases may also be insoluble, water is formed at the anode. At the negative electrode or cathode, water is decomposed to hydrogen gas and base ions by means of electrons supplied through the external circuit.

Electrodes can be made from carbon in which a noble or other active metal catalyst has been incorporated. In lieu of a carbon-catalytic electrode, a catalyst per se as for instance platinum or nickel can be employed. Methods for making such electrodes have been previously described. However, with respect to the manufacture of such catalytic electrodes, it should be noted that waterproofing agents, such as polytetrafluoroethylene, can be advantageously added to a carbon-catalyst or other electrode composition prior to the forming of the electrode, to insure maximum contact of gas with catalyst and electrolyte.

For purposes of the present invention, the electrodes can be made of the same material, or they may be made of different materials. For instance, the positive electrode can contain graphitic carbon and platinum or other catalyst and the negative electrode can contain lamp black and an active metal other than platinum as the catalyst.

Various reactions which occur in the purification cell depend upon the electrolyte employed. These reactions may be summarized as follows:

In an acid electrolytic medium:
(1) at the anode: $H_2 \rightarrow 2H^+ + 2e$
(2) at the cathode: $2H^+ + 2e \rightarrow H_2\uparrow$ In a base electrolytic medium:
(3) at the anode: $H_2 + 2OH^- \rightarrow 2H_2O + 2e$
(4) at the cathode: $2H_2O + 2e \rightarrow H_2\uparrow + 2OH^-$ In the above, illustrative electrolytes are, for instance: aqueous solutions comprising sulfuric acid, phosphoric acid, p-toluenesulfonic acid, aqueous sodium hydroxide, aqueous potassium hydroxide, or non-aqueous electrolyte, such as perchloric acid dissolved in acetonitrile. As stated previously, the acid electrolyte's primary function is to insure that hydrogen ions formed at the positive electrode or anode are transported to the negative electrode. This is accomplished by providing for a drop of potential between the positive and negative electrode. The electrolyte is interposed between the catalytic electrodes. It may be employed either as a solid electrolyte, such as an ion exchange membrane, or as a liquid electrolyte. The latter can also be employed to saturate a paper or other suitable membrane. The selection of the particular electrolyte which is ultimately employed should be one such as to minimize the passage of gas impurities therethrough, while maximizing the passage of either hydrogen ions or water from the positive electrode to the negative electrode. An analysis of the issuing gases at the negative electrode will indicate whether or not a proper selection of the electrolyte has been made. Thus, a substantial amount of impurities in the issuing gas, e.g., 5% or greater, indicates that the electrolyte either is excessively permeable to the impure gas mixture, or is one in which impurities are excessively soluble. Obviously, the latter electrolyte which so-functions, would not be chosen in the instant invention.

The present invention can be practiced with rather small amounts of external power. This results from the low polarization of the electrodes. In general, a voltage exceeding that required for transporting hydrogen ions through the electrolyte is all the voltage that is necessary. Accordingly, the minimum potential necessary to establish the proper functioning of the purification cell can be readily determined by reference to the well-known Nernst equation:

$$E = E_0 - 2.3 \frac{RT}{nF} \log \frac{p_1}{p_2}$$

wherein:

E is equal to the voltage necessary to cause hydrogen ions to be transported from the positive electrode to the negative electrode;
$E_0$ is the standard cell potential which is zero for hydrogen;
R is the gas constant;
T is the absolute temperature;
n is the number of electrons involved in the electrode process per ion;
F is the number of Faradays in coulombs;
$p_1$ is the partial pressure of the hydrogen gas existing at the positive electrode; and
$p_2$ is the partial pressure of hydrogen gas existing at the negative electrode.

Thus, where a mixture of one-tenth (0.1) of a mol of hydrogen and nine-tenths (0.9) of a mol of nitrogen is introduced into a typical purification cell at 25° C. containing acid electrolyte, the following calculations can be made to determine the minimum voltage required to establish a differential to transport or drive the hydrogen ions and electrons from the positive electrode to the negative electrode, if the cell outlet is maintained at one atmosphere. The calculations are as follows:

$$E = E_0 - 2.3 \frac{RT}{nF} \log \frac{0.1}{1}$$

$$E = 0 - 2.3 \times \frac{8.31 \times 298}{96,500}[-1]$$

$$E = +0.059 \text{ volt}$$

The above voltage is minimal. However, due to the resistance of the electrolyte in the cell, additional voltage would have to be provided. The voltage is dependent on current passed and the internal resistance of the purification cell. Stated otherwise, the above voltage is minimum potential necessary to establish proper functioning of the cell. Control of the electrolyte concentration is also necessary, since the electrolyte per se offers resistance which results in an additional power requirement. To minimize that power requirement, the concentration of either the acid or base electrolyte can be adjusted to a predetermined level for maximum conductance. Additionally, the thickness of the electrodes and the spacing between the electrodes can be minimized so as to reduce resistance to the flow of ions.

In general, from about 0.01 volt to about 1.5 volts is satisfactory to maintain an effective, sufficient difference in potential at the electrodes. Passage from the positive to the negative electrode of hydrogen ions or water through the electrolyte is readily accomplished. It will be seen from the Nernst equation above that the minimal voltage will depend upon the partial pressure of the gases in the mixture to be purified.

In the accompanying drawings, which are merely exemplary and are to be taken as non-limitative, two types of purification cells constituting preferred embodiments utilizing such purification cells, are presented. Thus, in FIG. 1 and FIG. 2, there are shown two modifications of the purification cell in cross-section. FIG. 3 is a schematic diagram for effecting the separation and removal of hydrogen in predetermined quantities from a mixture of gases.

In FIG. 1, there is shown an inlet port 1, whereby an impure gas stream passes into an electrically inert container 2. The gas stream contacts a gas-permeable but liquid-impermeable electrode 3 which acts as separator. It is made from active metal catalyst and, if desired, includes other additives, such as carbon and a waterproofing agent. Utilizing an acid electrolyte 4, hydrogen ions and electrons are formed at the electrode 3 in contact with the incoming gas mixture. Since the gases, other than hydrogen, are insoluble in the electrolyte 4, they are exited at outlet port 5. Through an external power source 6, a potential difference is established whereby hydrogen ions are transported through electrolyte 4 to a negative electrode 7. Upon contact at the negative electrode 7, electrons supplied by the external circuit through line 6a convert the hydrogen ions to hydrogen gas. The latter is then withdrawn at exit port 8 as substantially pure hydrogen.

In the event, electrolyte 4 employed above is an aqueous alkali, such as aqueous potassium hydroxide, water is formed at electrode 3 with release of electrons. Hydrogen gas and hydroxyl ions are also formed when electrons are supplied from the external circuit through line 6a at electrode 7. The electrodes can be of the same material, or one may contain a catalyst material different from the other.

Figure 2:
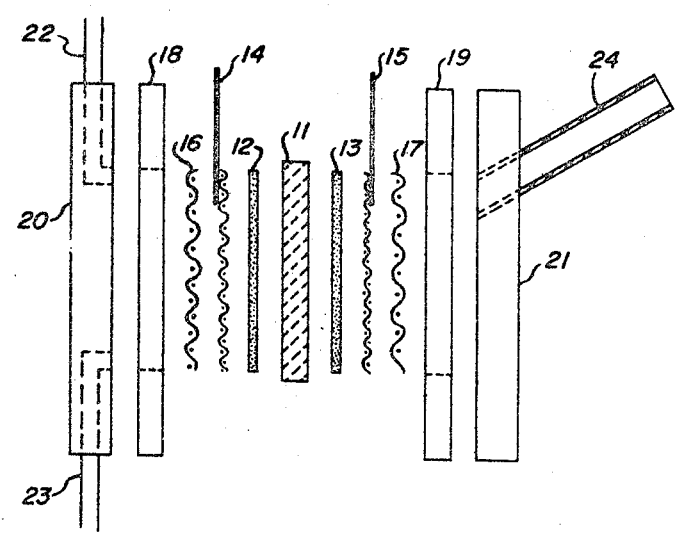

A preferred matrix purification cell shown as an exploded view in FIG. 2 is prepared by assembling the following elements: A membrane such as, for instance, a paper filter is saturated with electrolyte. This membrane is designated as 11. Electrodes are represented by 12 and 13 and can be prepared by molding either a noble metal or a mixture of carbon and noble metal with a water-proofing agent. Contacting the electrodes are metal screens 14 and 15 which are directly linked to an external power source. Spacers composed of inert metal 16 and 17 are pressed directly against screens 14 and 15. Sealing gaskets 18 and 19 are provided to minimize leakage and the entire assembly is held in place by face plates 20 and 21. Impure hydrogen gas mixture enters through port 22 which ultimately leads to the electrode 12 and membrane 11 containing, for instance, 6 N sulfuric acid electrolyte. Since the electrode does not permit passage of the impure gas therethrough, the impure gas is then exited through port 23. When contact of hydrogen is made at electrode 12, hydrogen ions are permitted to pass through the electrode 12 and the hydrogen ions are reconstituted at electrode 13, thereby forming substantially pure hydrogen which is ultimately exited through port 24. The assembled elements are compressed and secured by bolts (not shown).

In FIG. 3 there is shown a schematic representation of the purification cell 30 in conjunction with the external power source 31. Also shown are a potentiometer 32 and ammeter 33 which conveniently allow the monitoring of current through the cell, thus permitting variations in the rate of flow of hydrogen gas. This is accomplished by providing for increases or decreases in potential or voltage drop across the cell by the adjustment of an external resistor 34. A power or voltage source is represented at 31. The source may be as stated previously, a dry cell or any D.C. power source. The variable resistor allows for the control of voltage drop across the cell and, therefore, control of passage of hydrogen ions through the cell is had. On one side of the purification cell an impure gas stream 35 as shown, is permitted to flow and on the other side of the cell a stream 36 of substantially pure hydrogen emerges and is recovered. Impure gas is exited at 37. Although one purification cell is shown, it is within the purview of the invention that a plurality of cells can be employed either in series or in parallel with a single power source. However, in order to facilitate a further understanding of the invention, the following examples are presented primarily for the purpose of illustrating certain more specific details thereof. The scope of the invention is not to be deemed limited thereby, except as defined in the claims. Unless otherwise stated, all parts and percentages are by weight.

EXAMPLE 1

An electrode sheet is formed by applying to a 200 mesh steel cloth a mixture of platinum (79.75%), a colloidal silica (7.25%) and polytetrafluoroethylene (13%) to provide a platinum loading of 11.2 milligrams per square centimeter, and then molding the supported electrode under a pressure of 320 p.s.i. and 300° C. The molded sheet is then treated with 3% aqueous potassium hydroxide, and washed with water.

Two electrodes are cut from the so-formed sheet. Five discs of filter paper are next saturated with 6 N sulfuric acid and then sandwiched between the two formed electrodes. The electrodes are connected to an external power source. The active area of each electrode is 4.9 square centimeters. When ultimately assembled as shown in FIG. 2 of the drawing, the cell has an internal resistance of 0.22 ohm. Pure hydrogen is passed through the gas inlet and emerges from the outlet side of the cell. At a current of 347 milliamperes per square centimeter (1.7 amperes), the voltage drop across the cell is 0.41 volt.

When the above system is established, the gas inlet to the cell is switched to a mixture of methane (24%), ethane (3%), carbon monozide (18%) and hydrogen (55%). Under these conditions, the voltage drop across the cell is 0.99 volt at 0.29 ampere current. A sample of purified hydrogen gas is collected and analyzed by mass spectroscopy. At least 96% of pure hydrogen exclusive of water vapor is obtained and the rate of hydrogen evolution is at least 98% based on the theoretical.

EXAMPLE 2

A cell prepared as in Example 1 is utilized except that palladium is substituted for platinum. The internal resistance of the cell is 0.24 ohm. With pure hydrogen as the input gas, the cell exhibits a voltage drop of 0.09 volt at a current of 298 milliamperes per square centimeter.

Pure hydrogen input is then terminated. A commercial gas consisting of 40% hydrogen and 60% nitrogen is introduced at the inlet side of the purification cell. Under these conditions, the voltage drop across the cell is 0.30 volt at 1 ampere current and 0.11 volt at 0.3 ampere current. Hydrogen which is obtained at the outlet ports is found to analyze at least 98% pure utilizing mass spectroscopy. Hydrogen evolution is maintained at a rate of at least 95% of the theoretical by regulating the current.

EXAMPLE 3

Following the procedure of Example 2, except that the electrode contains rhodium in lieu of palladium, the purity of the hydrogen recovered is substantially the same.

EXAMPLE 4

An electrode is formed utilizing 11.2 milligrams per square centimeter of platinum black admixed with 1.02 milligrams colloidal silica on 200 mesh stainless steel cloth. Polytetrafluoroethylene (13%) is added to the platinum black mixture and the entire supported electrode is molded at a temperature of 300° C. to 320° C. and a pressure of 300 p.s.i. Thereafter, the colloidal sillica is extracted with concentrated sodium hydroxide for 1.5 hours at 60° C. to 70° C. The excess alkali is washed out of the electrodes by means of water.

Five discs of filter paper are saturated with 23% aqueous potassium hydroxide. They are then sandwiched between two formed electrodes that are connected to a suitable power source. The active area of each electrode is 4.9 square centimeters. When ultimately assembled as shown in FIG. 2 of the drawing, the cell has an internal resistance of 0.41 ohm. At 395 milliamperes the cell has a voltage drop of 0.305 volt when passing 96% hydrogen gas through the cell.

A mixture of 40:60 hydrogen to nitrogen gas ratio is next pumped into the inlet side of the cell. A voltage drop of 0.26 volt at a current of 0.19 ampere is observed. Hydrogen analyzing 98.5% purity is recovered.

EXAMPLE 5

This example illustrates the metering action involved in a purification cell.

Catalytic electrode sheet containing 13% polytetrafluoroethylene, 7% colloidal silica and 80% palladium supported on 200 mesh stainless steel wire cloth is prepared as in Example 2 above. Palladium concentration is 11.2 milligrams per square centimeter. Resultant electrode sheet is treated for two hours at room temperature with 23% potassium hydroxide to remove colloidal silica. Five sheets of filter paper are next saturated with 6 N phosphoric acid. The cell is finally assembled as in FIG. 2 of the drawing.

The purification cell is operated at a current of 200 milliamperes while a commercial mixture of 40% hydrogen and 60% nitrogen is passed through the inlet side of the cell. The voltage drop across the cell is 0.40 volt.

The purified hydrogen on the outlet side is trapped in an inverted burette wherein 99% pure hydrogen is collected through displacement of water. The purified hydrogen flow rate is measured in the burette with a stop watch. The rate of hydrogen flow is found to be 1.54 to 1.55 cubic centimeters per minute. For instance, in eleven minutes, 16.92 cubic centimeters of gas are collected. The calculated flow rate is 1.55 cubic centimeters per minute.

Advantageously, a variety of gas-permeable, liquid-impermeable electrode structures can be employed herein. Illustrative of one such outstanding structure is disclosed in a copending application, Ser. No. 522,964, filed on Jan. 25, 1966, by H. P. Landi. In that application, there is disclosed a process for preparing electrode structures by heating polymethylmethacrylate to a molten state, blending therein both polytetrafluoroethylene in the form of finely divided particles as an aqueous dispersion and a conductive filler, cooling the blended mixture, pelletizing the latter and extruding the so-formed pellets directly into a sheet, treating the latter sheet with a suitable selective solvent for polymethylmethacrylate, extracting polymethylmethacrylate from said sheet and recovering an electrically-conductive, porous, self-supporting, unsintered, extensively fibrillated electrode structure.

We claim:

1. A process for purification of hydrogen by means of an electrolytic cell which comprises a porous, hydrogen permeable, catalytic anode contacting on one of its sides an electrolyte-free zone containing a gas mixture comprising hydrogen, a porous, hydrogen permeable, cathode contacting on one of its sides an electrolyte-free zone for collection of hydrogen gas from said cathode, an electrolyte matrix contacting both said anode and said cathode on their respective sides opposite their sides contacting said respective zones: said process comprising the steps of (a) electrolytically oxidizing hydrogen to hydrogen ion at said anode and solubilizing the hydrogen ion as produced into the electrolyte, (b) electrolytically reducing hydrogen ion from the electrolyte at said cathode and reconstituting molecular hydrogen gas from the reduced hydrogen, (c) passing said hydrogen gas through said cathode to said electrolyte-free zone for collection of purified hydrogen gas, while (d) supplying electric power to said cell as needed to drive the defined cell process.

2. The process according to claim 1, in which the electrolyte in said matrix is sulfuric acid.

3. The process according to claim 1, in which the electrolyte in said matrix is sodium hydroxide.

4. The process according to claim 1, in which the catalytic electrode comprises palladium.

5. The process according to claim 1, in which each catalytic electrode comprises platinum.

6. The process according to claim 1, in which each catalytic electrode comprises rhodium.

7. The process according to claim 1, in which the gas mixture to be purified comprises 40:60 hydrogen to nitrogen, respectively.

8. The process according to claim 1, in which the gas mixture to be purified comprises carbon monoxide (18%), methane (24%), ethane (3%) and hydrogen (55%).

References Cited

UNITED STATES PATENTS

| | | | |
|---|---|---|---|
| 409,366 | 8/1889 | Mond et al. | 136—86 |
| 2,384,463 | 9/1945 | Gunn et al. | 204—1.07 |
| 2,928,891 | 3/1960 | Justi et al. | 204—1.06 |
| 3,092,516 | 6/1963 | Rightmire | 136—86 |
| 3,103,473 | 9/1963 | Juda | 204—1.06 |
| 3,124,520 | 3/1964 | Juda | 204—1.06 |
| 3,134,697 | 5/1964 | Niedrach | 136—86 |
| 3,180,762 | 5/1965 | Oswin | 136—86 |

HOWARD S. WILLIAMS, Primary Examiner

H. M. FLOURNOY, Assistant Examiner

U.S. Cl. X.R.

204—1